(12) United States Patent
Plano Morillo et al.

(10) Patent No.: US 10,240,582 B2
(45) Date of Patent: Mar. 26, 2019

(54) WIND TURBINE WITH A ROTOR POSITIONING SYSTEM

(71) Applicant: GAMESA INNOVATION & TECHNOLOGY, S. L., Sarriguren (Navarra) (ES)

(72) Inventors: Eugenio Plano Morillo, Zamudio (ES); Ignacio Fernandez Romero, Zamudio (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 685 days.

(21) Appl. No.: 14/968,150

(22) Filed: Dec. 14, 2015

(65) Prior Publication Data

US 2016/0195069 A1 Jul. 7, 2016

(30) Foreign Application Priority Data

Dec. 24, 2014 (ES) .................................. 201401039

(51) Int. Cl.
*F03D 7/04* (2006.01)
*F03D 7/02* (2006.01)
(Continued)

(52) U.S. Cl.
CPC .......... *F03D 7/0276* (2013.01); *F03D 1/0675* (2013.01); *F03D 1/0691* (2013.01); *F03D 7/0224* (2013.01); *F03D 7/0268* (2013.01); *F03D 7/0272* (2013.01); *F03D 7/043* (2013.01); *F03D 9/255* (2017.02); *F03D 13/20* (2016.05); *F03D 17/00* (2016.05); *F03D 80/82* (2016.05); *F03D 7/044* (2013.01); *F03D 80/50* (2016.05);
(Continued)

(58) Field of Classification Search
CPC .... F03D 7/0276; F03D 7/0224; F03D 7/0272; F03D 7/043; F03D 7/044; F03D 7/0268; F03D 1/0691; F03D 1/0675; F03D 13/20; F03D 80/82; F03D 9/255; F03D 17/00; F05B 2270/706; F05B 2270/705
USPC ................................................ 700/287–290
See application file for complete search history.

(56) References Cited

U.S. PATENT DOCUMENTS 4,161,658 A * 7/1979 Patrick .................. F03D 7/0224
290/44
2013/0270829 A1* 10/2013 Miyamoto ............ F03D 7/0224
290/51

* cited by examiner

*Primary Examiner* — Jason D Shanske
*Assistant Examiner* — Maxine M Adjagbe
(74) *Attorney, Agent, or Firm* — Ladas & Parry LLP

(57) ABSTRACT

The invention provides a wind turbine having a system for positioning the rotor in an azimuthal reference position $Az_{ref}$ and for maintaining it therein for a predetermined period of time, the wind turbine being arranged in test mode. Said rotor positioning system comprises a first controller (31) configured to generate a generator speed reference $\Omega_{ref}$ from the difference between the rotor azimuthal reference position $Az_{ref}$ and the rotor azimuthal measured position $Az_{meas}$ and a second controller (35) configured to generate a generator torque reference $T_{ref}$ from the difference between said generator speed reference $\Omega_{ref}$ and the generator speed measured $\Omega_{meas}$.

5 Claims, 3 Drawing Sheets

(51) Int. Cl.
F03D 17/00 (2016.01)
F03D 1/06 (2006.01)
F03D 9/25 (2016.01)
F03D 80/80 (2016.01)
F03D 13/20 (2016.01)
F03D 80/50 (2016.01)

(52) U.S. Cl.
CPC ... *F05B 2260/83* (2013.01); *F05B 2270/1032* (2013.01); *F05B 2270/32* (2013.01); *F05B 2270/326* (2013.01); *F05B 2270/327* (2013.01); *F05B 2270/705* (2013.01); *F05B 2270/706* (2013.01); *Y02E 10/721* (2013.01); *Y02E 10/723* (2013.01); *Y02E 10/725* (2013.01)

WIND TURBINE WITH A ROTOR POSITIONING SYSTEM

FIELD OF THE INVENTION

The invention relates to a rotor positioning system of a wind turbine.

BACKGROUND

Over the life of wind turbines there are several tasks that must maintain fixed the rotor in a certain position.

One of these tasks is the rotor locking to ensure it does not rotate which is needed to perform certain maintenance activities. Rotor locking systems typically comprise one or more pins (often two pins) which are pushed into holes in the stationary part of the wind turbine to prevent rotation of the rotor and therefore require a system to position the rotor so that the pins are perfectly aligned with the holes. The rotor locking process is difficult and time consuming. This task is even more complex when the wind speed increases and become impossible above certain wind speed.

Another of these tasks is the access of service personnel transported by helicopters to offshore wind turbines that have helihoist platforms where is needed to have the rotor stationary while the helicopter is nearby.

Another of these tasks is the calibration of the blade load sensors where the rotor shall be maintained fixed in various positions (and also having the blades at different pitch angles in each position) to compare the calibration with the static moments in said positions.

All these tasks must be performed in narrow ranges of time and within a wide range of speeds.

Known rotor positioning systems for such tasks have a high manual component and do not therefore allow a remote operation which would be very desirable especially in offshore wind turbines.

SUMMARY OF THE INVENTION

The invention provides a wind turbine having a system for positioning the rotor in an azimuthal reference position $Az_{ref}$ and for maintaining it therein for a predetermined period of time, the wind turbine being arranged in test mode, so that during that period of time the tasks mentioned in the previous section can be carried out. This system comprises a first controller configured to generate a generator speed reference $\Omega_{ref}$ from the difference between the rotor azimuthal reference position $Az_{ref}$ and the rotor azimuthal measured position $Az_{meas}$ and a second controller configured to generate a generator torque reference $T_{ref}$ from the difference between said generator speed reference $\Omega_{ref}$ and the generator speed measured $\Omega_{meas}$.

The first and/or the second controller can be PI (Proportional, Integral) controllers or PID (Proportional, Integral, Derivative) controllers being its variable gains dependent of the wind speed $V_{meas}$ measured at the height of the rotor hub.

The wind turbine comprises an Uninterruptible Power Supply (UPS) device or a connection to a power grid to provide power to the generator when acting as a motor under the control of the rotor positioning system.

Other features and advantages of the present invention will be understood from the following detailed description of illustrative and by no means limiting embodiments of its object in relation with the enclosed drawings.

DETAILED DESCRIPTION OF THE INVENTION

Figure 1:
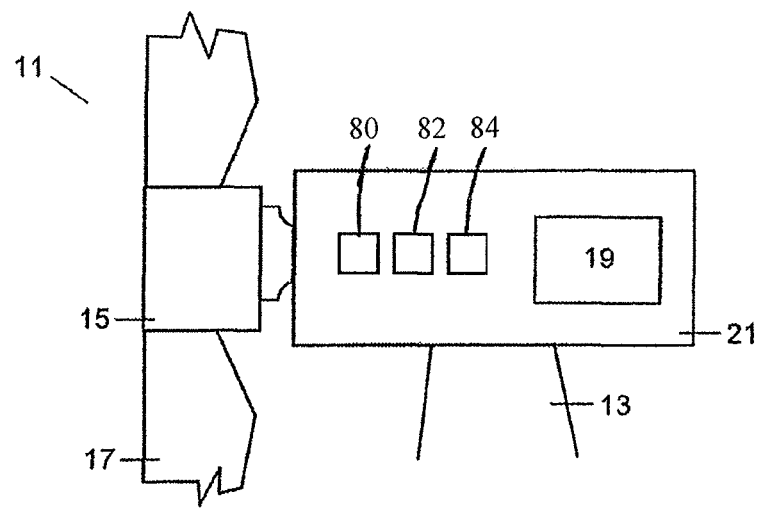
FIG. 1 is a schematic cross sectional view of a wind turbine.

A typical wind turbine 11 comprises a tower 13 supporting a nacelle 21 that houses a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor to the generator 19 and increase the shaft speed in order to achieve a suitable rotational speed of the generator rotor. The wind turbine 11 comprises a measuring device 80 for measuring wind speed V, a measuring device 82 for measuring generator speed $\Omega$ and a measuring device 84 for measuring rotor azimuthal position Az.

The wind turbine 11 also comprises means allowing the generator 19 acting as a motor receiving power from a suitable source such as an Uninterruptible Power Supply (UPS) device available in the own wind turbine 11 or an electricity grid to which the turbine 11 is connected. Thus, the generator 19 can be used as a rotor driving means.

The wind turbine power output is controlled by means of a control system for regulating the pitch angle of the rotor blades and the generator torque. The rotor rotational speed and power output of the wind turbine can hereby be controlled.

For implementing said regulation the control system receives input data such as wind speed V, generator speed $\Omega$, pitch angle $\theta$, power P from well-known measuring devices and send output data $\theta_{ref}$, $T_{ref}$ to, respectively, the pitch actuator system for changing the pitch of the blades 17 and to a generator command unit for changing the torque reference for the power production.

According to the invention the wind turbine 11 also comprises a rotor positioning system which allows placing it in a particular position when the wind turbine 11 is in a test mode, i.e. when the wind turbine does not produce energy, the rotor and the power train rotate freely by the wind action and the brake system is disabled.

That particular position is expressed in terms of an azimuthal reference position $Az_{ref}$. For example, the azimuthal position 0 deg means that the blade 1 of the wind turbine 11 has its tip pointing to the sky, the azimuthal position 90 deg means that, looking at the wind turbine from outside and from an observer in front of it, the blade 1 would be rotated clockwise 90 deg and the azimuthal position 180 deg means that the blade 1 is pointing to the ground. The azimuthal position of the rotor is measured by a sensor located on the low speed side of the drive train which generates a pulse when the blade 1 is in the azimuthal position 0 deg. Depending on the transmission ratio between the low speed shaft and the high speed shaft and this pulse the azimuthal position is calculated by integration.

Figure 2:
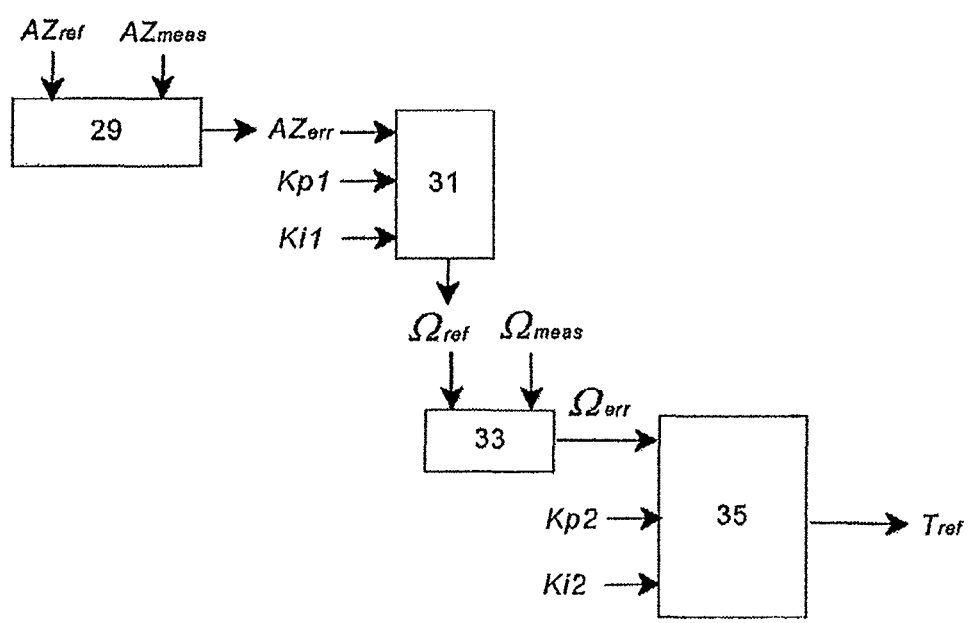
FIG. 2 is a schematic block diagram illustrating an embodiment of the rotor positioning system according to the invention with two PI controllers.

In one embodiment of the invention using PI (proportional integral) controllers the rotor positioning system (see FIG. 2) comprises:

A first PI controller 31 that generates a generator speed reference $\Omega_{ref}$ from the azimuthal error $Az_{err}$, obtained in a module 29 which is configured to calculate it from the azimuthal reference position $Az_{ref}$ and the azimuthal measured position $Az_{meas}$ (by the above-mentioned sensor) and the proportional and integral gains Kp1 and Ki1 dependent on the wind speed V (measured with an anemometer located at the height of the rotor hub 15).

A second PI controller 35 that generates a generator torque reference $T_{ref}$ from the generator speed error $\Omega_{err}$, obtained in a module 33 which is configured to calculate it from the generator speed reference $\Omega_{ref}$ and the measured generator speed $\Omega_{meas}$ (upon application of a filter to remove high frequency components) and the proportional and integral gains Kp2 and Ki2.

Figure 3:
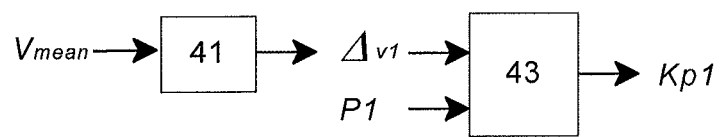
FIGS. 3-6 are schematic block diagrams illustrating how the proportional and integral gains of the two PI controllers are obtained.

The proportional gain Kp1, expressed in rpm/deg, is obtained (see FIG. 3) in a module 43 which is configured to calculate it multiplying a variable gain value $\Delta_{v1}$ dependent of the measured wind speed $V_{mean}$ at the height of the rotor hub 15, averaged at 600 s, by a parameter P1, expressed in rpm/deg, which defines the proportional gain of the first PI controller 31. The value of the variable gain $\Delta_{v1}$ is obtained in a module 41 which is configured to calculate it from $V_{mean}$ using an interpolation table.

Figure 4:
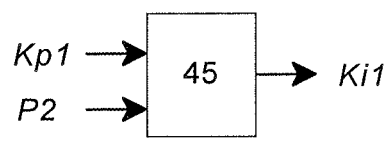

The integral gain Ki1, expressed in s*rpm/deg, is obtained (see FIG. 4) in a module 45 which is configured to calculate it from the proportional gain Kp1 and a parameter P2, expressed in s, which defines the integral time on the first proportional integral controller 31.

Figure 5:
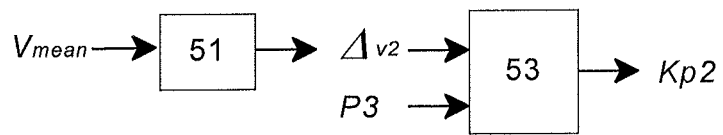

The proportional gain Kp2, expressed in Nm/rpm, is obtained (see FIG. 5) in a module 53 which is configured to calculate it multiplying a variable gain value $\Delta_{v2}$ dependent of the measured wind speed $V_{mean}$ at the height of the rotor hub 15, averaged at 600 s, by a parameter P3, expressed in Nm/rpm, which defines the proportional gain of the second PI controller 31. The variable gain value $\Delta_{v2}$ is obtained in a module 51 which is configured to calculate it from $V_{mean}$ using an interpolation table.

Figure 6:
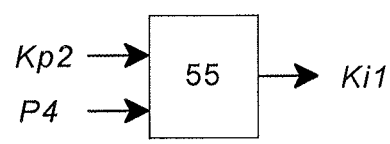

The integral gain Ki2, expressed in s*rpm/deg, is obtained (see FIG. 6) in a module 55 which is configured to calculate it from the proportional gain Kp2 and a parameter P4, expressed in s, which defines the integral time on the second proportional integral controller 35.

Figure 7:
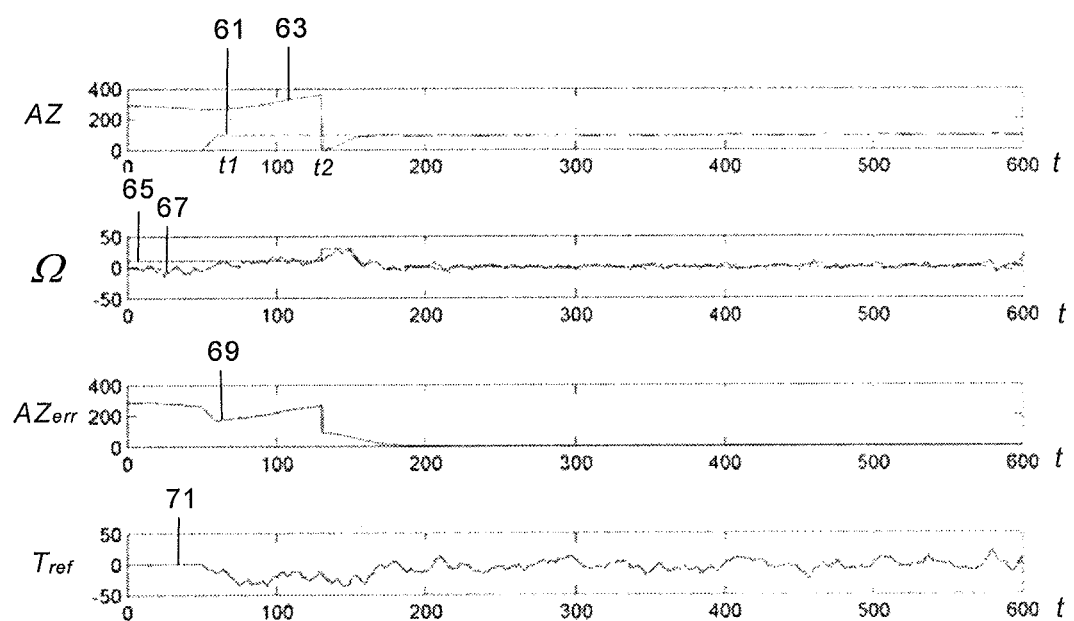
FIG. 7 illustrates the operation of the rotor positioning system to place it in the azimuthal position 90 deg.

The following curves (see FIG. 7) illustrate the operation of the rotor positioning system to place it on the azimuthal position 90 deg:

The curve 61 represents the azimuthal reference position $Az_{ref}$ (90 deg).

The curve 63 represents the evolution in time of the azimuthal measured position $Az_{meas}$.

The curve 65 represents the evolution in time of the generator speed reference $\Omega_{ref}$.

The curve 67 represents the evolution in time of the measured generator speed $\Omega_{meas}$.

The curve 69 represents the evolution in time of the azimuthal error $Az_{err}$.

The curve 71 represents the evolution in time of the generator torque reference $T_{ref}$.

As shown, the rotor positioning system begins to demand an initial generator speed reference $\Omega_{ref}$ of 20 rpm (curve 65) and, since time t1, an azimuthal reference position $Az_{ref}$ of 90 deg (curve 61).

Once the azimuthal measured position $Az_{meas}$ (curve 63) matches the azimuthal reference position $Az_{ref}$ (curve 61) at time t2, the controllers 31, 35 are activated to achieve the generator torque reference $T_{ref}$ (curve 71) needed to keep $Az_{ref}$ at 90 deg. The azimuthal error $Az_{err}$ reaches 0 at 200 s and the generator torque reference $T_{ref}$ varies with time taking positive and negative values.

The main advantage of the invention is that it allows automation of the wind turbine operation to maintain fixed the rotor in a given azimuthal position for some time to perform operations such as rotor blocking, personnel access to the wind turbine from helicopters and blade load sensors calibration.

Although the present invention has been described in connection with various embodiments, it will be appreciated from the specification that various combinations of elements, variations or improvements therein may be made, and are within the scope of the invention as defined by the appended claims.

The invention claimed is:

1. A wind turbine (11) comprising:
   (a) a tower (13) and a nacelle (21) housing a generator (19) connected to a rotor comprising a rotor hub (15) and at least one blade (17), wherein the generator is configured to act as a motor;
   (b) measuring devices of, at least, wind speed V, generator speed $\Omega$ and rotor azimuthal position Az;
   (c) a control system connected to said measuring devices and to at least pitch and torque control actuators;
   (d) a system for positioning the rotor in an azimuthal reference position $Az_{ref}$ and for maintaining it therein during a predetermined period of time when the wind turbine is in a test mode, the system comprising:
      (i) a first controller (31) configured to generate a generator speed reference $\Omega_{ref}$ from a difference between the azimuthal reference position $Az_{ref}$ and a rotor azimuthal measured position $Az_{meas}$ and proportional and integral gains Kp1 and Ki1 that are dependent on the wind speed V measured at a height of the rotor hub; and
      (ii) a second controller (35) configured to generate a generator torque reference $T_{ref}$ from a difference between said generator speed reference $\Omega_{ref}$ and a generator speed measured position $\Omega_{meas}$ and proportional and integral gains Kp2 and Ki2 that are dependent on the wind speed V measured at the height of the rotor hub,
   wherein the first and second controllers, when activated, maintain a torque that keeps the rotor in the azimuthal reference position $Az_{ref}$ during the test period.

2. The wind turbine (11) according to claim 1, wherein:
   the proportional gain Kp1, expressed in rpm/deg, is obtained in a first module (43) configured to calculate it from a variable gain value $\Delta_{v1}$ that is dependent on the wind speed $V_{meas}$ measured at the height of the rotor hub (15), and a first parameter defining the proportional gain of the first controller (31);
   the integral gain Ki1 is obtained in a second module (45) configured to calculate it from the proportional gain Kp1 and a second parameter that defines the integral time of the first controller (31);
   the proportional gain Kp2, is obtained in a third module (53) configured to calculate it from a variable gain value $\Delta_{v2}$ dependent on the measured wind speed $V_{meas}$ at the height of the rotor hub (15) and a third parameter defining the proportional gain of the second controller (35); and
   the integral gain Ki2 is obtained in a fourth module (55) configured to calculate it from the proportional gain Kp2 and a fourth parameter that defines the integral time of the second controller (35).

3. The wind turbine (11) according to claim 1, wherein the first and second controller (31, 35) are proportional, integral and derivative controllers and their proportional, integral and derivative gains are dependent variables of the wind speed $V_{meas}$ measured at the height of the rotor hub (15).

4. The wind turbine (11) according to claim 1, further comprising an Uninterruptible Power Supply (UPS) device for providing energy to the generator (19) when the wind turbine is in the test mode and the generator (19) acts as a motor.

5. The wind turbine (11) according to claim 1, further comprising a connection to an electricity grid to power the generator (19) when the wind turbine is in a test mode and the generator (19) acts as a motor.

\* \* \* \* \*